United States Patent
Kwon et al.

(10) Patent No.: US 7,520,681 B2
(45) Date of Patent: Apr. 21, 2009

(54) BUTT COUPLING STRUCTURE AND METHOD OF PHOTONIC QUANTUM RING HOLE EMITTER

(75) Inventors: O'Dae Kwon, Kyungsangbuk-do (KR); Seungeun Lee, Kyungsangbuk-do (KR)

(73) Assignee: Postech Academy-Industry Foundation, Kyungsangbuk-Do (KR)

( * ) Notice: Subject to any disclaimer, the term of this patent is extended or adjusted under 35 U.S.C. 154(b) by 0 days.

(21) Appl. No.: 12/068,687

(22) Filed: Feb. 11, 2008

(65) Prior Publication Data

US 2008/0138017 A1   Jun. 12, 2008

Related U.S. Application Data

(63) Continuation-in-part of application No. PCT/KR2006/001001, filed on Mar. 20, 2006.

(30) Foreign Application Priority Data

Aug. 16, 2005   (KR) .................. 10-2005-0074846

(51) Int. Cl.
*G02B 6/36* (2006.01)
*G02B 6/12* (2006.01)
*G02B 6/42* (2006.01)
*H01S 3/083* (2006.01)

(52) U.S. Cl. .................. 385/88; 385/14; 385/27; 372/94

(58) Field of Classification Search ............. 385/88, 385/27, 14; 350/96; 372/96, 94
See application file for complete search history.

(56) References Cited

U.S. PATENT DOCUMENTS

| 4,400,056 A * | 8/1983 | Cielo ..................... 385/27 |
| 4,744,623 A * | 5/1988 | Prucnal et al. ............. 385/14 |
| 5,434,939 A | 7/1995 | Matsuda |
| 6,519,271 B2 | 2/2003 | Kwon et al. |
| 6,845,118 B1 * | 1/2005 | Scott ..................... 372/96 |
| 6,879,752 B1 | 4/2005 | Ilchenko et al. |

FOREIGN PATENT DOCUMENTS

| JP | 56-091481 A | 12/1979 |
| JP | 57-090984 A | 11/1980 |
| KR | 10-2006-0025419 | 3/2006 |

OTHER PUBLICATIONS

B. H. Park et al "Evanescent and propagating wave characteristics of the photonic quantum ring laser", Applied Physics Letters, vol. 79, No. 11, pp. 1593-1595 (2001).*
Fiedler et al, "Compact VCSEL module with butt-coupled fibre for efficient modelocking", Electronics Letters, vol. 30, No. 15, pp. 1226-1227 (1994).*
J.C. Ahn, et al. "Photonic Quantum Ring", Physical Review Letters, The American Physical Society, Jan. 18, 1999, vol. 82, No. 3, pp. 536-539.

* cited by examiner

*Primary Examiner*—Frank G Font
*Assistant Examiner*—Robert Tavlykaev
(74) *Attorney, Agent, or Firm*—Bacon & Thomas, PLLC

(57) ABSTRACT

An optical coupling structure includes a PQR hole emitter having a PQR hole, and an optical fiber whose one side is tapered into the PQR hole. An index-matching solution such as a photo-resist or a photo-resist diluted solution is injected into the PQR hole to adhere the optical fiber and the PQR hole.

16 Claims, 6 Drawing Sheets

BUTT COUPLING STRUCTURE AND METHOD OF PHOTONIC QUANTUM RING HOLE EMITTER

This application is a Continuation-In-Part Application of PCT International Application No. PCT/KR2006/001001 filed on Mar. 20, 2006, which designated the United States.

TECHNICAL FIELD

The present invention relates to an optical coupling of a light-emitting device; and, more particularly, to a butt coupling structure and a butt coupling method of a PQR (Photonic Quantum Ring) hole emitter using an optical fiber.

BACKGROUND ART

As well known in the art, a very high-data rate backbone network for optical communication employs an active component, e.g., a high-quality laser diode (LD)/photo diode (PD), an optical switch, a high-speed router, a DWDM (Dense Wavelength Division Multiplexing) device, a cross connect device or the like. Meanwhile, it is important for a subscriber network in great demand to employ efficient, simply manufacturable, solid and low-priced components. Especially, an efficient optical coupling of an optical device, e.g., a laser, is indispensable for an optical performance. As for various methods for achieving a enhanced butt coupling efficiency by way of matching modal profiles between the optical device and the optical fiber, there have been suggested a optical coupling via a passive optical device such as micro-lenses or fiber tips and a direct coupling method. However, in the optical coupling method using micro-lenses, an optical axis alignment between the micro-lenses and the optical fibers needs to be performed within a submicron level and, further, a high cost is required for a specific apparatus or the like to assembly them. As for the fiber tip, a lensed fiber or a tapered fiber is used. In such case, an appropriate working distance is required between the micro-lenses and the optical devices, which lengthens a front end of the optical fiber.

As for related information, there is a report on "Development of TEC lensed ribbon fiber for optical devices packaging", published by Electronics and Telecommunications Research Institute, Korea, Nov. 11, 2003.

DISCLOSURE OF INVENTION

It is, therefore, an object of the present invention to provide a butt coupling structure and method of an optical device, e.g., a PQR hole emitter capable of increasing an optical coupling strength of the PQR hole emitter with an optical fiber.

In accordance with a first aspect of the present invention, there is provided an optical coupling structure, which includes: a PQR hole emitter having a PQR hole; and an optical fiber whose one side is inserted into the PQR hole, wherein an index-matching solution is injected into the PQR hole to adhere the optical fiber and the PQR hole.

In accordance with a second aspect of the present invention, there is provided a butt coupling method of a PQR hole emitter having a PQR hole, the method including the steps of: forming one end of an optical fiber thinner than a diameter of the optical fiber; inserting said one end of the optical fiber into the PQR hole; and adhering the optical fiber and the PQR hole by using an index-matching solution.

In accordance with a third aspect of the present invention, there is provided a butt coupling method of a PQR hole emitter having a PQR hole, the method including the steps of: forming one end of an optical fiber thinner than a diameter thereof; and inserting said one end of the optical fiber into the PQR hole.

In accordance with a fourth aspect of the present invention, there is provided a butt coupling method of a PQR hole emitter having a PQR hole, the method including the steps of: inserting one end of an optical fiber into the PQR hole; and adhering the optical fiber and the PQR hole by using an index-matching solution.

BRIEF DESCRIPTION OF DRAWINGS

The above and other objects and features of the present invention will become apparent from the following description of preferred embodiments given in conjunction with the accompanying drawings, in which.

BEST MODE FOR CARRYING OUT THE INVENTION

The preferred embodiment of the butt coupling method of the PQR hole emitter in accordance with the present invention will be described with reference to the accompanying drawings.

Figure 1:
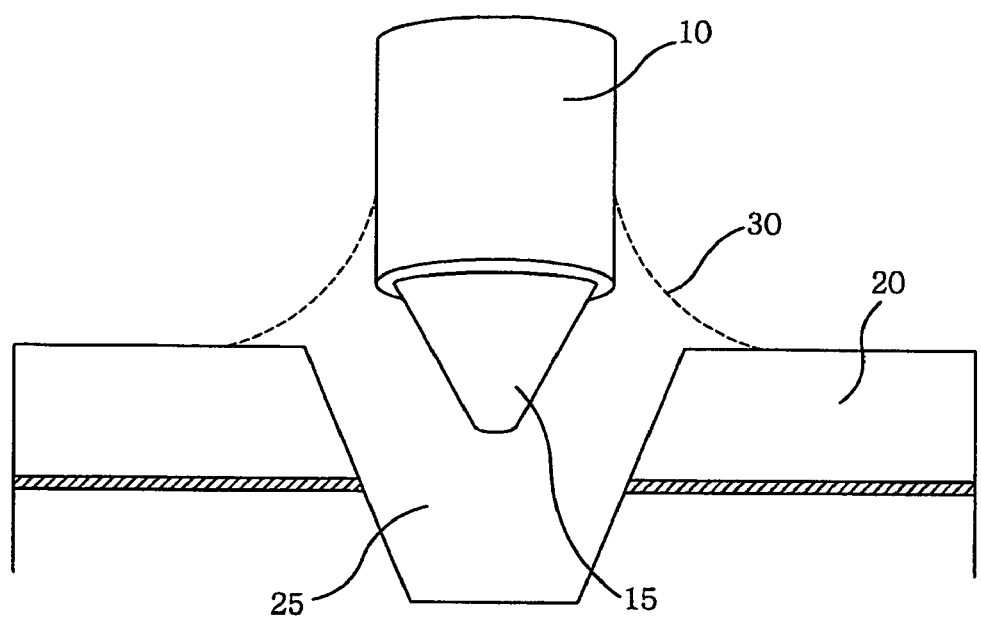
FIG. 1 illustrates a butt coupling structure of a PQR hole emitter in accordance with the present invention.

Referring to FIG. 1, there is shown a butt coupling structure of a PQR hole emitter with an optical fiber constructed in accordance with the present invention.

An optical fiber 10 includes a multimode optical fiber, and one side thereof has a sharpen end 15. The sharpen end 15 is inserted into a PQR hole 25 formed at a periphery of a PQR hole emitter 20.

The PQR hole emitter 20 is one of PQR lasers, especially a convex-whispering gallery mode laser in which light is emitted from a convex boundary surface.

Further, a variable index-matching adhesive 30 is injected into the PQR hole 25 with the sharpen end 15, thereby coupling the optical fiber 10 and the PQR hole emitter 20. The variable index-matching adhesive includes a photo-resist or a photo-resist diluted solution, for example, which is diluted in a ratio of 1:10 with acetone as an organic solvent.

Meanwhile, in order to assist easy understanding of the present invention, a background technology related to the PQR hole emitter will be explained as follows.

A PQR laser (see, J. C. Ahn et al., "Photonic Quantum Ring", Phys. Rev. Lett. Vol. 82(3), pp. 536-539, January 1999; and U.S. Pat. No. 6,519,271 B2, entitled "PHOTONIC QUANTUM RING LASER DIODE") generally has characteristics of quantum wire and thus can operate with a minimum threshold current of several μA. Moreover, a wavelength shift depending on a temperature is proportional to a square root of the temperature, so that the wavelength can be stabilized at a high operating temperature. Consequently, the PQR laser can be used as a light source required for an optical integrated circuit for processing high capacity information. Such PQR laser is manufactured as a mesa structure.

The PQR laser whose photons are confined by a total reflection in a toroidal Rayleigh-Fabry-Perot resonator oscillates in a three-dimensional WGM (whispering gallery mode). WGM devices developed ever since the principle of Rayleigh's concavity are all based on the total reflection on concave surfaces, and a mesa type PQR laser also belongs to such class.

However, WGM devices in recent are capable of emitting light and lasing in a reverse mesa type PQR laser of a convex-WGM as well as a mesa type one.

Figure 2:
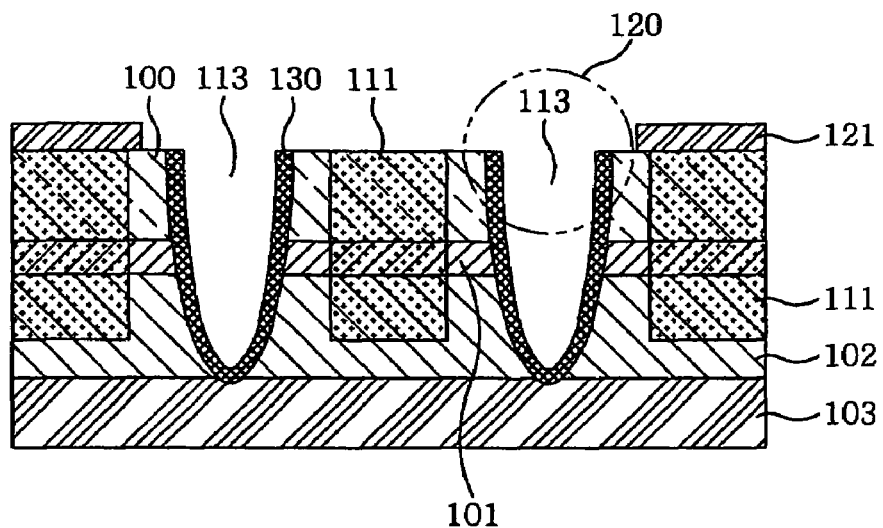
FIG. 2 shows a cross sectional view of a PQR hole emitter.
Figure 3:
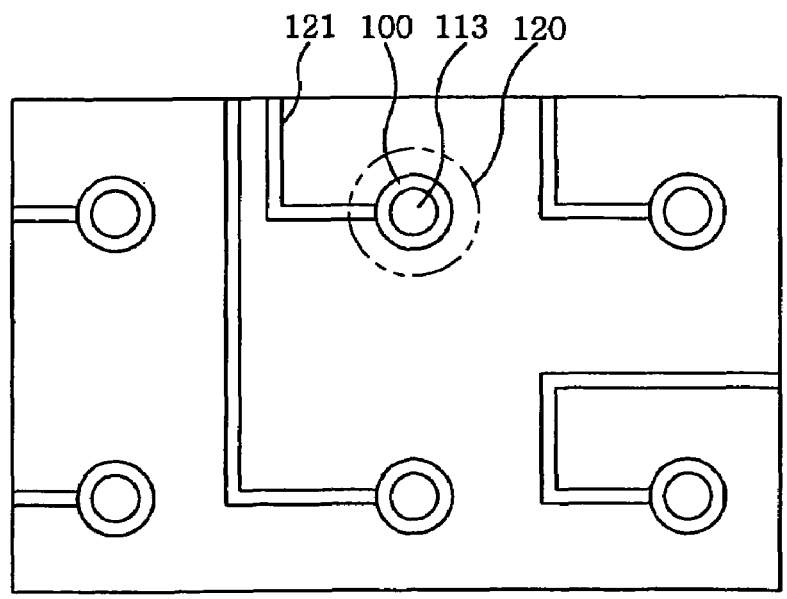
FIG. 3 describes a top view of a PQR hole emitter.

FIGS. 2 and 3 illustrate a configuration of the reverse mesa type PQR laser. As shown in FIG. 2, an n-DBR (an n-type distributed Bragg reflector) 102, an active region 101, and a p-DBR (a p-type distributed Bragg reflector) 100 are formed on a substrate 103 using an epitaxial growth technique, to thereby form a PIN type semiconductor wafer. Then, ions, e.g., $H^+$ ions are vertically implanted into the PIN type semiconductor while leaving a region to be formed a hole at regular intervals. Sequentially, the PIN type semiconductor has an ion-implanted region 111 and a remainder region, i.e., a non-implanted region 120 at which a hole 113 will be formed. As will be disclosed later, the ion-implanted region 111 serves to insulate between the holes.

After the implantation of the $H^+$ ions, each non-implanted region 120 in the PIN type semiconductor is etched using a CAIBE (chemical assisted ion beam etching) to form the hole 113. Herein, a reference numeral 130 represents a passivation film treated with sulfur and then coated with silicon nitride ($SiN_x$) film inside the hole 113.

Subsequently, as shown in FIG. 3, a line-shaped p-type electrode 121 is connected to around each hole 113 (i.e., the non-implanted region 120 having the hole 113) for applying current thereto, respectively, to thereby form the reverse mesa type PQR laser. The description on the PQR laser as set forth above is fully disclosed in Korean Patent publication No. 10-2006-0025419, on Mar. 21, 2006.

Figure 4:
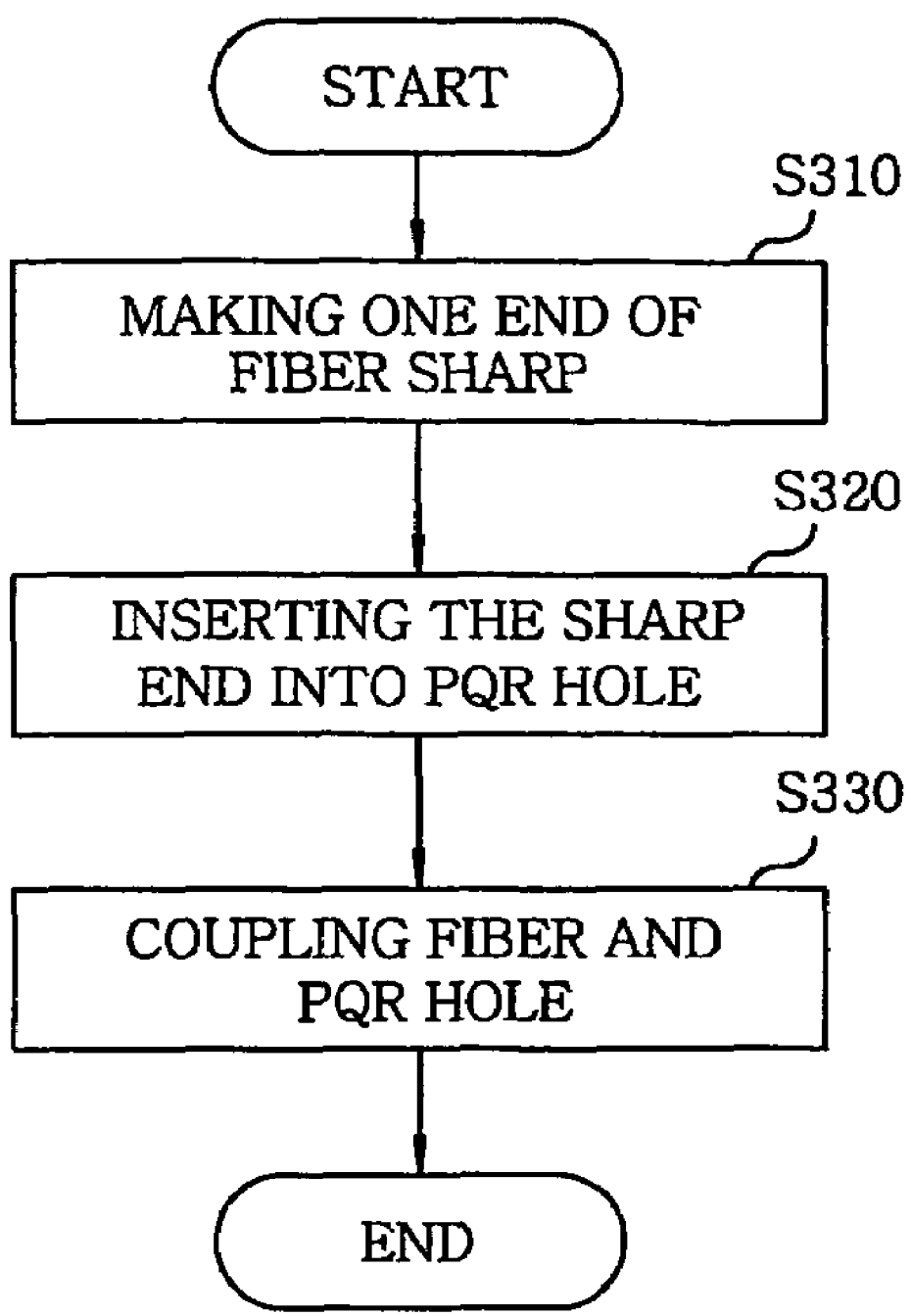
FIG. 4 offers a flowchart of the butt coupling method of the PQR hole emitter in accordance with the present invention.

Referring now to FIG. 4, there is provided a flowchart to explain a butt coupling method in accordance with the present invention.

Figure 5:
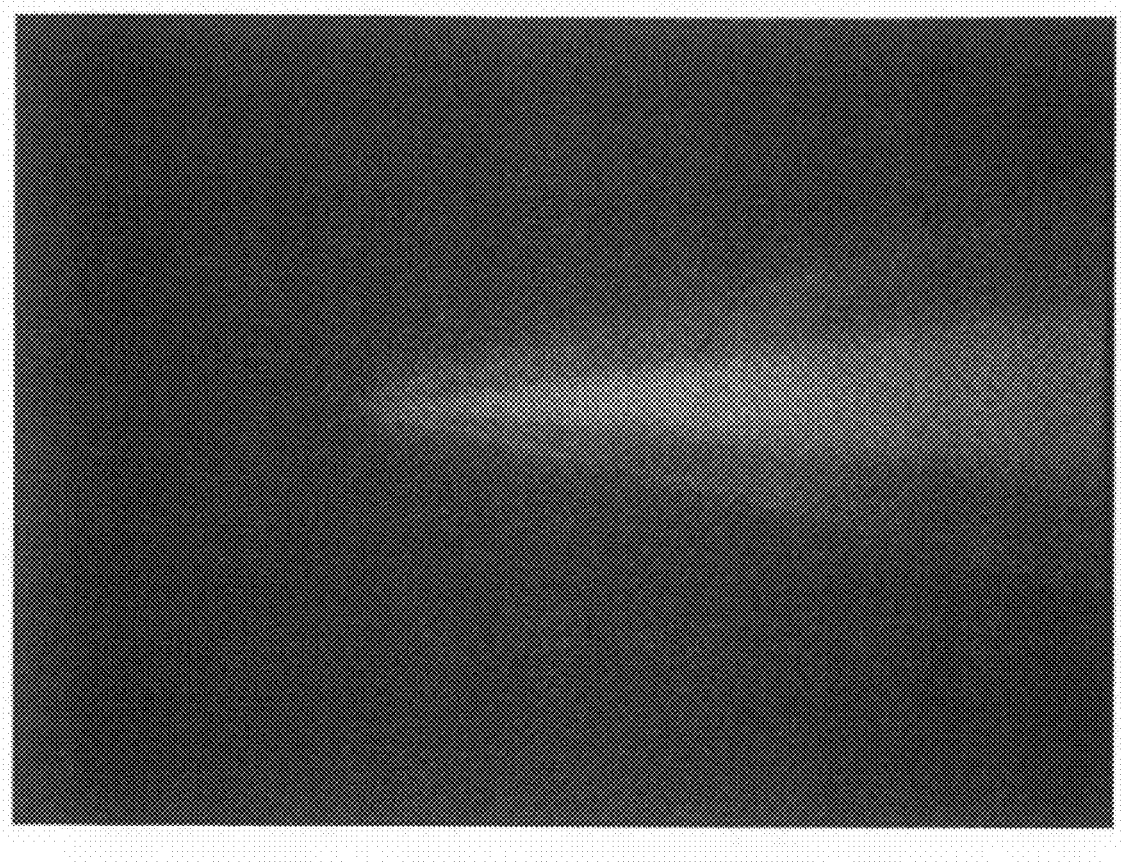
FIG. 5 provides a CCD image of a multimode optical fiber chemically etched, which is enlarged with an optical magnification up to ×1000, in accordance with the method of the present invention.

First of all, in step S310, there is prepared a multimode optical fiber 10 for performing a butt coupling of the PQR hole emitter 20, and one end of the multimode optical fiber 10 is chemically etched to make the one end of the optical fiber 10 sharp where the one end has a diameter smaller than that of the multimode optical fiber 10. More specifically, the multimode optical fiber 10 is etched by using a surface tension on an interface of HF and silicon oil so that a diameter of the one end becomes about 2 μm. Consequently, the end of the multimode optical fiber 10 becomes sharpen or tapered, as shown in FIG. 5. Herein, it is sufficient for the sharpen end 15 of the optical fiber 10 to be sharpen enough for inserting into the PQR hole 25 and coupled therewith.

Next, in step S320, the sharpen end 15 of the optical fiber 10 is inserted into the PQR hole 25 of the PQR hole emitter 20.

In such inserted state, in step S330, the optical fiber 10 and the PQR hole emitter 20 are coupled to each other via the PQR hole 25 by using a variable index-matching adhesive 30. Accordingly, a butt coupling structure of the PQR hole emitter is achieved.

Alternatively, the adhesive strength of the index matching solution can be enhanced due to the irregularities of the PQR hole. In other words, even if an end portion of the optical fiber is not sharpen, when the optical fiber is coupled with the hole having the irregularities, an adhesive strength of an epoxy component of the index matching solution greatly increases, thereby enabling to provide a stable coupling component.

Further, in the present invention, instead of the multimode optical fiber, a single-mode optical fiber can be optically coupled with the PQR hole emitter. However, in case of using the single-mode optical fiber, the light intensity decreases compared to a case where the multimode optical fiber is coupled with the PQR hole emitter.

Figure 6:
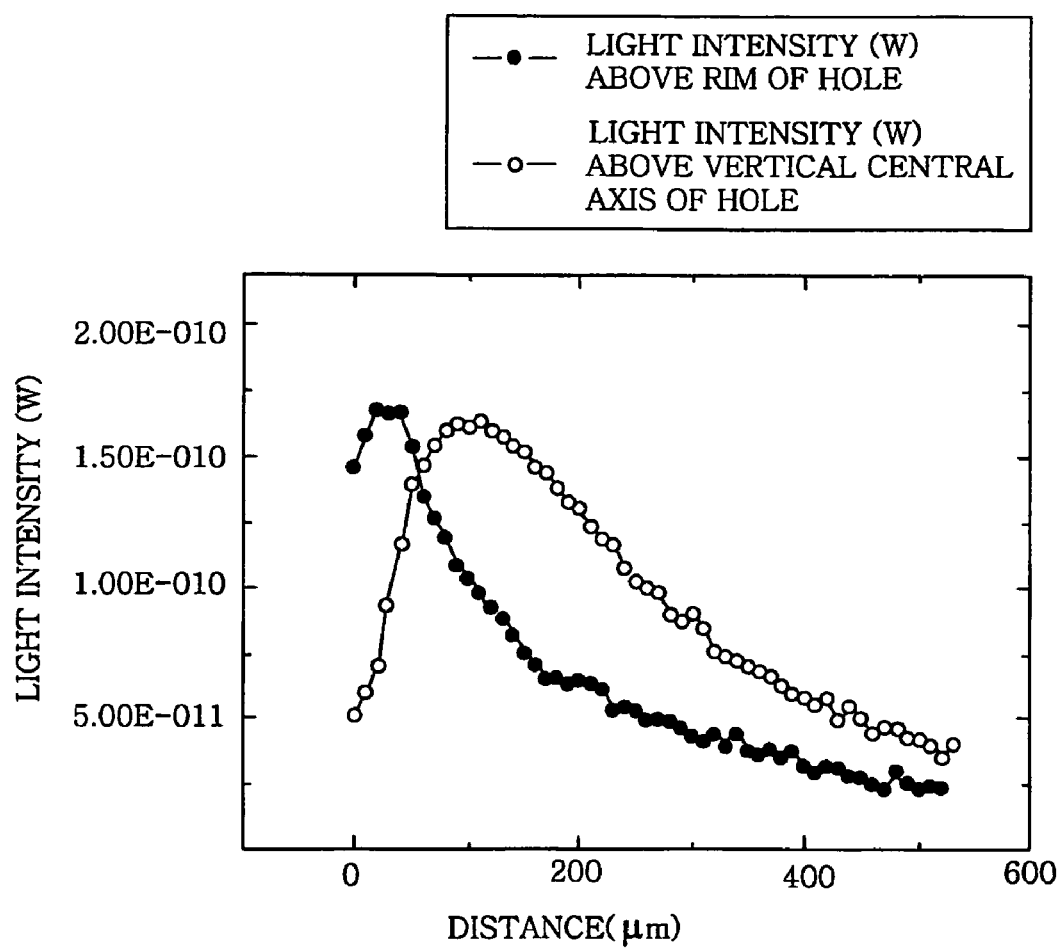
FIG. 6 is a graph showing light intensity changes of a PQR hole emitter by distance, e.g., $\Phi=7$ μm, where a current I=2 mA is applied, which is measured while separating an etched multimode fiber from above a vertical central axis of the hole and above a rim of the hole on a 10 μm basis.
Figure 7:
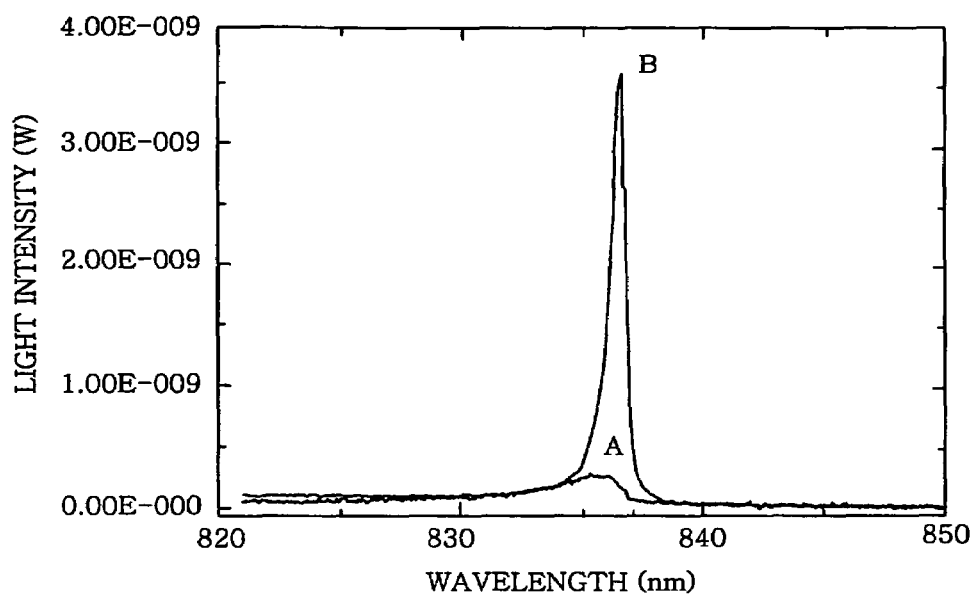
FIG. 7 presents a graph for comparing a spectrum 'A' obtained when an optical fiber is just inserted into a hole (e.g., $\Phi=7$ μm, I=2 mA) with a spectrum 'B' obtained when a maximum output is produced after dropping a photo-resist diluted solution into the hole having the optical fiber inserted therein.

FIG. 6 is a graph showing light intensity (W) changes of a PQR hole emitter (e.g., Φ=7 μm) where a current I=2 mA is injected, which are measured while separating an etched multimode fiber from above a vertical central axis of the hole and above a rim of the hole on a 10 μm basis. As known from FIG. 6, the greatest light intensities are obtained when the multimode fiber is near a peripheral surface of the PQR hole in case of measuring at the peripheral of the PQR hole and when the multimode fiber is floated above the inside of the PQR hole by about 90 μm in case of measuring at the peripheral of the PQR hole. These indicate that the PQR hole emitter oscillates along the periphery of the PQR hole not along the inside of the PQR hole. Therefore, in case the optical fiber is just inserted into the PQR hole, an optical output is low, as indicated by an emission spectrum 'A' of FIG. 7. However, if a photo-resist diluted solution is used as a variable index-matching adhesive for coupling the optical fiber 10 and the PQR emitter 20, the optical output increases by thirteen times, as shown by the spectrum 'B' of FIG. 7.

Figure 8:
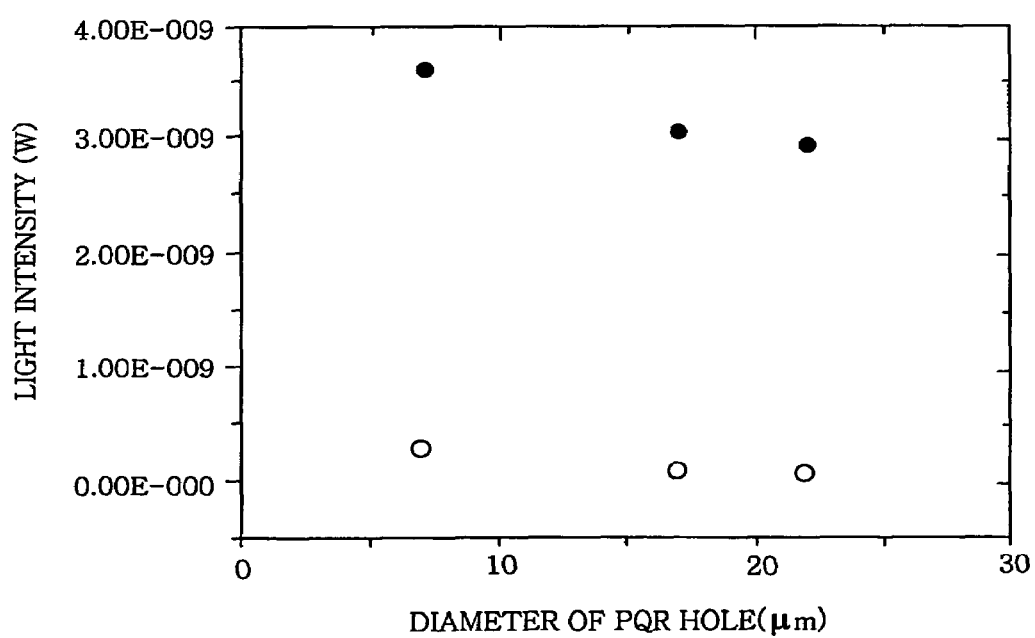
FIG. 8 explains a butt coupling effect depending on a size of a PQR hole emitter and also represents a light intensity depending on a hole size, which is respectively measured when the maximum output is produced after dropping a photo-resist diluted solution into the hole and when the etched optical fiber is exclusively inserted into the PQR hole.

FIG. 8 presents a light intensity depending on a size of the PQR hole emitter. The notation '○' of FIG. 8 indicates the light intensity measured when the optical fiber is inserted into the PQR hole without using a photo-resist diluted solution in case of the PQR hole emitters having hole diameters Φ of 7 μm, 17 μm and 22 μm, respectively. The notation '●' of FIG. 8 represents the light intensity measured after dropping the photo-resist diluted solution into the holes having the aforementioned diameters. As can be seen from FIG. 8, the light intensity greatly increases after the photo-resist diluted solution is dropped.

In the meantime, a PQR hole emitter made of, e.g., (Al) GaAs, has a lasable critical diameter of about 50 μm. If the PQR hole emitter has a greater diameter than that, it represents a light emitting mode of LED. However, if the PRQ hole emitter has a diameter greater than 30 μm to 40 μm, its lasing condition is disturbed.

As described above, in order to be coupled with a PQR hole emitter, an etched optical fiber is inserted into a PQR hole of the PQR hole emitter and, then, an index-matching solution is injected into the PQR hole, thereby implementing an optical coupling structure at a low cost. Consequently, it is observed that such optical coupling structure provides an increased coupling efficiency.

Moreover, the optical coupling intensity can increase regardless of an external impact by help of using the index-matching solution.

Further, it is understood that the PQR hole emitter can be located at a center of a mesa. In this case, it is possible to utilize the emissions from the PQR hole and the mesa.

While the invention has been shown and described with respect to the preferred embodiments, it will be understood by those skilled in the art that various changes and modifications may be made without departing from the scope of the invention as defined in the following claims.

What is claimed is:

1. An optical coupling structure comprising:
   a PQR hole emitter having a PQR hole; and
   an optical fiber whose one side is inserted into the PQR hole,
   wherein an index-matching solution is injected into the PQR hole to adhere the optical fiber and the PQR hole.

2. The optical coupling structure of claim 1, wherein the optical fiber is a multi-mode optical fiber.

3. The optical coupling structure of claim 1, wherein the optical fiber is a single-mode optical fiber.

4. The optical coupling structure of claim 1, wherein said one end of the optical fiber is sharpened by a chemical etching.

5. The optical coupling structure of claim 1, wherein the index matching solution is a photo-resist or a photo-resist diluted solution.

6. A butt coupling method of a PQR hole emitter having a PQR hole, the method comprising the steps of:
   forming one end of an optical fiber thinner than a diameter thereof;
   inserting said one end of the optical fiber into the PQR hole; and
   adhering the optical fiber and the PQR hole by using an index-matching solution.

7. The method of claim 6, wherein the optical fiber includes a multi-mode optical fiber.

8. The method of claim 6, wherein the optical fiber includes a single-mode optical fiber.

9. The method of claim 6, wherein said one end of the optical fiber is formed by a chemical etching.

10. The method of claim 6, wherein the index-matching solution is a photo-resist or a photo-resist diluted solution.

11. The method of claim 6, wherein the adhering step includes a step of injecting the index-matching solution into the PQR hole to adhere the optical fiber and the PQR hole.

12. A butt coupling method of a PQR hole emitter having a PQR hole, the method comprising the steps of:
    forming one end of an optical fiber thinner than a diameter thereof; and
    inserting said one end of the optical fiber into the PQR hole.

13. The method of claim 12, further comprising a step of injecting an index-matching solution into the PQR hole to adhere the optical fiber and the PQR hole.

14. A butt coupling method of a PQR hole emitter having a PQR hole, the method comprising the steps of:
    inserting one end of an optical fiber into the PQR hole; and
    adhering the optical fiber and the PQR hole by using an index-matching solution.

15. The method of claim 14, wherein said one end of the optical fiber is formed by a chemical etching to have a tapered shape.

16. The method of claim 14, wherein the adhering step includes a step of injecting the index-matching solution into the PQR hole to adhere the optical fiber and the PQR hole.

* * * * *